United States Patent
Haartsen et al.

(10) Patent No.: US 7,184,705 B2
(45) Date of Patent: *Feb. 27, 2007

(54) DISTRIBUTED MAC IN AN UNCOORDINATED RADIO ENVIRONMENT

(75) Inventors: Jacobus Haartsen, Hardenburg (NL); Rakesh Taori, Eindhoven (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 390 days.

This patent is subject to a terminal disclaimer.

(21) Appl. No.: 10/094,792

(22) Filed: Mar. 8, 2002

(65) Prior Publication Data

US 2004/0203348 A1   Oct. 14, 2004

(51) Int. Cl.
*H04B 7/00* (2006.01)

(52) U.S. Cl. .................. 455/41.2; 455/450; 455/509; 455/511; 375/220; 370/236.1

(58) Field of Classification Search ............ 455/41.2, 455/41.3, 450, 509, 511, 512; 375/220, 222, 375/356, 357, 358; 370/236, 229, 236.1, 370/236.2, 397, 431, 432, 436, 437, 389
See application file for complete search history.

(56) References Cited

U.S. PATENT DOCUMENTS

| | | | |
|---|---|---|---|
| 4,617,657 A | 10/1986 | Drynan et al. | 370/60 |
| 4,796,225 A | 1/1989 | Westbrook et al. | 370/100 |
| 5,222,061 A | 6/1993 | Doshi et al. | 370/13 |
| 5,297,144 A * | 3/1994 | Gilbert et al. | 370/346 |
| 5,544,158 A * | 8/1996 | Oprea et al. | 370/438 |
| 5,577,043 A * | 11/1996 | Guo et al. | 370/449 |
| 5,615,212 A * | 3/1997 | Ruszczyk et al. | 370/433 |

(Continued)

FOREIGN PATENT DOCUMENTS

| | | |
|---|---|---|
| WO | 99/37106 | 7/1999 |
| WO | WO-99/37106 * | 7/1999 |
| WO | 00/41529 | 7/2000 |
| WO | 01/58077 | 8/2001 |
| WO | 02/49272 | 6/2002 |

OTHER PUBLICATIONS

Jaap C. Haartsen: "The Bluetooth Radio System"; Ericsson Radio Systems B. V.; IEEE.; Feb. 2000; pp. 28-36.

(Continued)

*Primary Examiner*—Matthew Anderson
*Assistant Examiner*—Sanh Phu

(57) ABSTRACT

In a communication network having a plurality of units and a distributed MAC protocol, wherein data is exchanged between units during at least some of the time slots in a succession of time slots, a method is provided for establishing a desired network configuration. The method includes the step of designating one of the units as a supervisory unit and the other units as non-supervisory units. Certain of the time slots are designated as supervisory priority slots. All of the non-supervisory units are required to monitor transmissions from the supervisory unit during each of the supervisory priority slots, and the supervisory unit is operated to transmit an instruction establishing the desired network configuration only during one of the supervisory priority slots.

20 Claims, 3 Drawing Sheets

U.S. PATENT DOCUMENTS

| | | | |
|---|---|---|---|
| 5,701,311 A | 12/1997 | Kapoor | 371/32 |
| 5,727,002 A | 3/1998 | Miller et al. | 371/32 |
| 5,754,535 A * | 5/1998 | Vandenabeele et al. | 370/321 |
| 5,896,375 A | 4/1999 | Dent et al. | 370/347 |
| 6,414,986 B1 * | 7/2002 | Usui | 375/142 |
| 6,574,266 B1 * | 6/2003 | Haartsen | 375/133 |
| 2002/0034172 A1 | 3/2002 | Ho | 370/338 |

OTHER PUBLICATIONS

European Search Report; RS 108364; Mailed: Nov. 25, 2002.

Bruneel, Herwig et al. "Receiver Buffer Behavior for the Selective-Repeat ARQ Protocol". XP-000175533. pp. 129-142, Oct. 19, 1990.

Kalia, Manish et al. "MAC Scheduling and SAR policies for Bluetooth: A Master Driven TDD Pico-Cellular Wireless System". XP-002167155. pp. 384-388, Feb. 15, 2000.

\* cited by examiner

DISTRIBUTED MAC IN AN UNCOORDINATED RADIO ENVIRONMENT

BACKGROUND OF THE INVENTION

The invention disclosed and claimed herein generally pertains to an improved or enhanced distributed Multiple Access Control (MAC) for a radio network operating in an uncoordinated environment. More particularly, the invention pertains to a method and apparatus for a network control of the above type, wherein one of the network units or nodes is assigned certain supervisory functions. Even more particularly, the invention pertains to a network of the above type wherein resynchronization is made more robust, and network status and reconfiguration are communicated to all network units with significantly greater efficiency.

As is well known in the art, there is increasing interest in providing computers, telephones and other small electronic devices with the capability to connect and communicate wirelessly with one another, over short ranges, by means of radio links. Such capability could conceivably eliminate or substantially reduce the need for cables or infrared connections between devices such as computers, peripherals, telephones and headsets. Moreover, a number of devices could thereby be readily joined together to form small networks, or multiple networks, within a limited space. The assignee herein, a major supplier of mobile telecommunications equipment and systems, has initiated a program to develop a wireless communication capability of this type. This program, known as the "Bluetooth Short Range Radio System," is now supported by a number of large electronics industry vendors and suppliers. Bluetooth is intended to operate in an uncoordinated environment, and is thus designed to communicate at 2.45 GHertz over the Industrial, Scientific and Medical (ISM) band, which is unlicensed and globally available.

The Bluetooth communication system provides ad-hoc connectivity between devices and is characterized by absence of a central coordinating unit. In Bluetooth, all devices are equal and any two units can set up a connection. In one implementation, Bluetooth uses a "master-slave" principle, wherein access to the communication channel is regulated by the master device in real-time. Although any device can take on the role of master, the master plays a central role, and in this implementation absence of the master results in temporary disintegration of the network.

Recently, work has been initiated to expand the Bluetooth system by providing it with a high-rate mode. This effort is referred to, for example, in U.S. patent application Ser. No. 09/385,024, filed Aug. 30, 1999. Moreover, in order to increase flexibility of traffic exchange on the high-rate channel, an alternative MAC scheme has been proposed. In the alternative arrangement, instead of a centralized control as in the master-slave configuration referred to above, a more distributed control has been proposed. This distributed control uses a protocol referred to as a Ping-Pong protocol between a multiplicity of devices, and is based on an implicit token exchange concept. This arrangement is referred to in further detail in U.S. patent application Ser. No. 09/710,204, filed Nov. 9, 2000.

The token based Ping-Pong protocol is illustrated in FIG. 1, which shows units A, B and C of a Bluetooth network at different times during a succession of time slots. In accordance with the Ping-Pong protocol, packets are transmitted between units, wherein each packet has a header indicating packet length or duration. Thus, FIG. 1 shows unit A commencing or initiating a transmission, which is directed to unit C. Unit C is allowed to transmit a packet after unit A has finished transmission. Unit C will know when it can commence transmitting, by monitoring the length information in the header of the packet sent by unit A. At the same time, unit B senses that the transmission from A is directed toward C. This enables unit B to stop receiving, until the end of the transmission from unit A. After the transmission from A to C, unit C sends a packet to unit B. Unit B is then allowed to send, after completely receiving the packet sent from C and the unit C transmission ends. This transmission concept can be considered to use a token mechanism, wherein the token is carried from one unit to another unit by the transmitted packet. The token thus resides at a unit for only a short period of time, until the next transmission carries it to the next unit.

In the token passing arrangement described above, transmission failures may occur from time to time. Accordingly, to ensure unconditional access to the channel and to restart the Ping-Pong mechanism after a transmission failure, priority slots are defined within the framework of the Ping-Pong protocol. The priority slots serve as time markers reserved for transmissions by an associated unit, and only the associated unit is allowed to transmit on the slot. Thus, the token automatically resides at the unit associated with the priority slot. This provides a way of giving units unconditional access to the communication channel. If the timing is such that two or more priority slots of different units coincide, the unit with the highest priority receives the right to send. FIG. 2 shows an example of this priority slot concept in combination with the Ping-Pong protocol, wherein unit C has priority slots PS at fixed intervals of eight slots. Thus, at each priority slot PS unit C is exclusively granted the right to transmit. This right is granted unconditionally, i.e., the token is given to unit C based on its ownership of the priority slot at a fixed point in time, not because unit C received the token in a previous packet reception.

From the above, it will be seen that the token can be obtained by either (1) being received by a unit along with a received packet, or (2) being granted to the unit corresponding to a priority slot. The Ping-Pong protocol and the priority slots collectively constitute a MAC mechanism for the radio channel of the above network. Synchronization in the network, based on this protocol, is maintained by tracking the header of each transmission.

Notwithstanding its benefits, the distributed MAC described above is characterized by some important limitations and disadvantages. For example, the network could have three units A, B and C, wherein unit A is able to receive transmissions from unit B but not from unit C, due to limited range or fading conditions. Thus, whenever unit C initiates a transmission upon receiving the token, unit A may lose synchronization. In order to resynchronize, unit A would have to make use of unit B priority slots or its own priority slots, possibly resulting in long periods of synchronization loss for unit A.

A further problem can arise if unit A communicates only with unit B and not with any other unit of the network. The Ping-Pong protocol allows this by letting unit A listen to the priority slots of unit B. In this situation, unit A would not be aware that a unit D was added to the network. This could become very important, if D had priority traffic to send and therefore had priority slots. Unit A would need to be aware of this network addition or reconfiguration, in order to avoid overriding the priority slots of unit D. Yet another problem could arise if unit A and unit B were to negotiate certain new parameters like creating new priority slots, allocating new addresses, or other network-related parameters, which could conflict with similar decisions made by units C and unit D simultaneously. This could result in a conflict in the allocation of priority slots. Moreover, unit C could receive the token but have no traffic to send. It could send the token to unit B or unit D, but could not send it to unit A due to limited range. This could result in an unfair situation where unit A was "starved," or deprived of opportunity to transmit.

SUMMARY OF THE INVENTION

Embodiments of the invention address the problems identified above by introducing the concept of a supervisory unit. That is, one of the units of a MAC distributed communication network, as described above, is designated as the supervisory unit to perform the functions of synchronization, announcing (new) network configuration, token distribution, and any other network-related management functions. The supervisory unit carries out these functions using supervisory priority slots, that is, priority or recovery slots having a special function. The most important function for the supervisor is keeping the network synchronized and broadcasting changes in the network. In the arrangement of the invention, units or nodes participating in the network only need to track or monitor the supervisory unit during supervisory time slots, and need not monitor transmissions during other times. A subset of the supervisory priority slots can be used to distribute or broadcast network configurations and any changes in configuration. Thus, all units or nodes are made aware of the network configuration at all times. This enables any unit in the network to initiate traffic without violating the priority slot of any other unit. The supervisory priority slots can also be included in the token distribution scheme, thereby bringing some level of fairness to token distribution. It is to be understood that the terms "node," "unit" and "device" are used interchangeably and synonymously herein. Also, "network configuration" as used herein means a designation of specified timed slots as being priority time slots to a specified unit or units, and a designation of specified addresses representing physical devices or end points of logical links.

It is to be emphasized that the supervisory unit does not control the traffic in real-time, which is still regulated according to a distributed protocol, such as the Ping-Pong protocol and priority time slots as described above. Also, the supervisor does not directly control the access to the channel, which still remains distributed. Absence of the supervisory unit does not stall the network, and traffic will continue in its absence. It is only required that changes to the network may not be made until a new supervisory unit is appointed. Since all nodes have all of the configuration information all the time, any node or unit can take on the role as supervisor in a very short time, thereby significantly limiting the effects of a supervisory unit absence.

One useful embodiment of the invention is directed to a method for establishing a particular network configuration, in a communication network comprising a plurality of units and having a distributed MAC protocol, wherein data is exchanged between units in a succession of time slots. The method comprises the steps of designating one of the units as a supervisory unit, designating other of the units as non-supervisory units, and identifying certain of the time slots as supervisory priority time slots. The method further comprises directing or requiring all of the non-supervisory units to monitor transmissions from the supervisory units during each of the supervisory priority slots, and operating the supervisory unit to transmit a configuration or reconfiguration of a network only during supervisory priority slots. Preferably, the network uses a token distributing arrangement of the type described above, and the supervisory priority slots are included in the token distribution.

DETAILED DESCRIPTION OF A PREFERRED EMBODIMENT

It is to be emphasized that embodiments of the invention disclosed herein provide a distributed MAC, i.e., channel access is arranged among units of the MAC network themselves. However, there is a single unit that takes care of common features necessary to keep the network alive. These latter features are non-real-time features like synchronization (to define the channel), central broadcast (to avoid conflicts in decisions made locally by different devices), and token distribution (as the distributed MAC may otherwise result in starvation of certain devices).

Figure 1:
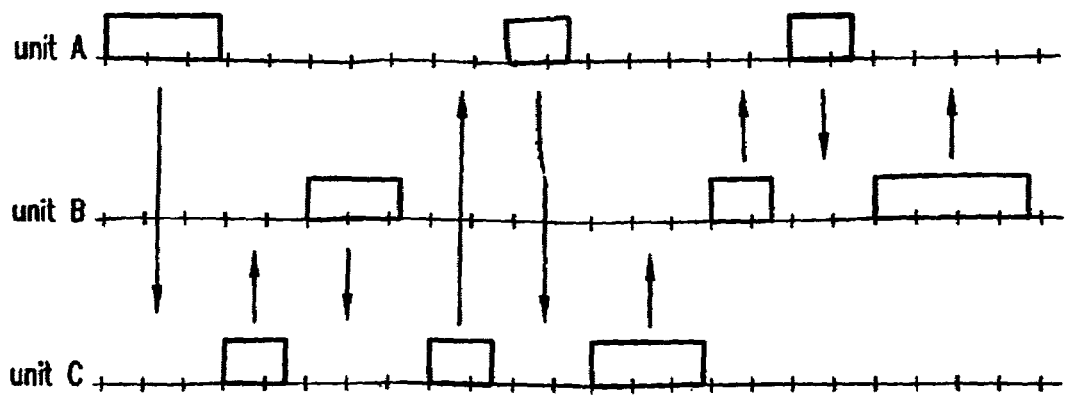
FIG. 1 shows operation of a Ping-Pong protocol arrangement for a communication channel with time slots and an exemplary three units.
Figure 2:
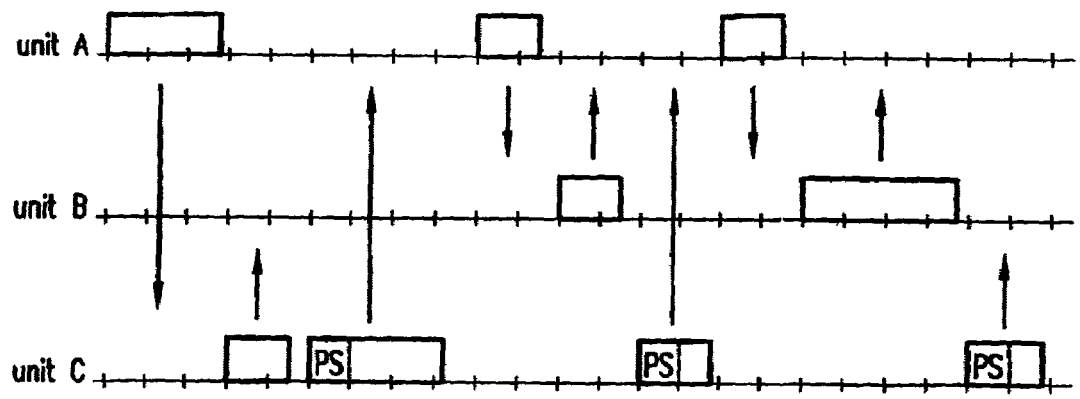
FIG. 2 illustrates an operation similar to the arrangement of FIG. 1, wherein certain time slots have been designated as priority slots for one of the units.
Figure 3:
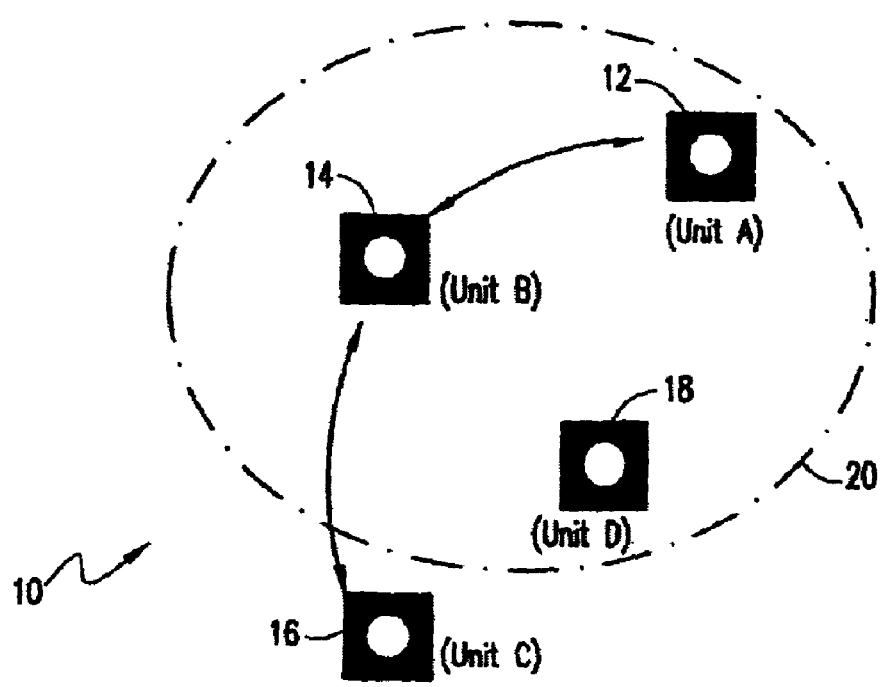
FIG. 3 is a schematic diagram depicting a positional relationship among units of a communication network using an embodiment of the invention.

Referring to FIG. 3, there is shown a distributed MAC radio network 10 comprising the transceiver nodes or units 12–18, which are also the respective units A–D referred to above. Thus, units A, B and D within boundary 20 are close enough to one another that they can all monitor or listen to all transmissions sent from one another. Unit C, outside boundary 20, is sufficiently close to units B and D to monitor transmissions therefrom. However, the range between units C and A is too great for unit C to detect or listen to unit A transmissions. Traffic in the communication channel established among the respective units A–D of network 10 is regulated in accordance with the Ping-Pong protocol, the token concept and priority slots, as previously described in connection with FIGS. 1 and 2. Thus, the communication channel is a time division duplex (TDD) communication channel, associated with a succession of time slots. Network 10 may be configured so that unit C, for example, has certain time slots assigned to it as priority slots.

In accordance with the invention, and to avoid problems of the type described above which can occur in network 10 when one unit is beyond transmission range of another, one of the units of network 10 is designed or designated to be the supervisory unit. Preferably, a unit within range of all other units, such as unit B or D, is designated to become the supervisor. For a proper functioning of the supervisor role, all units in the network must be in range of the supervisor selected. Certain time slots, referred to as supervisory priority slots, are selected to have priority to the supervisory unit.

Figure 4:
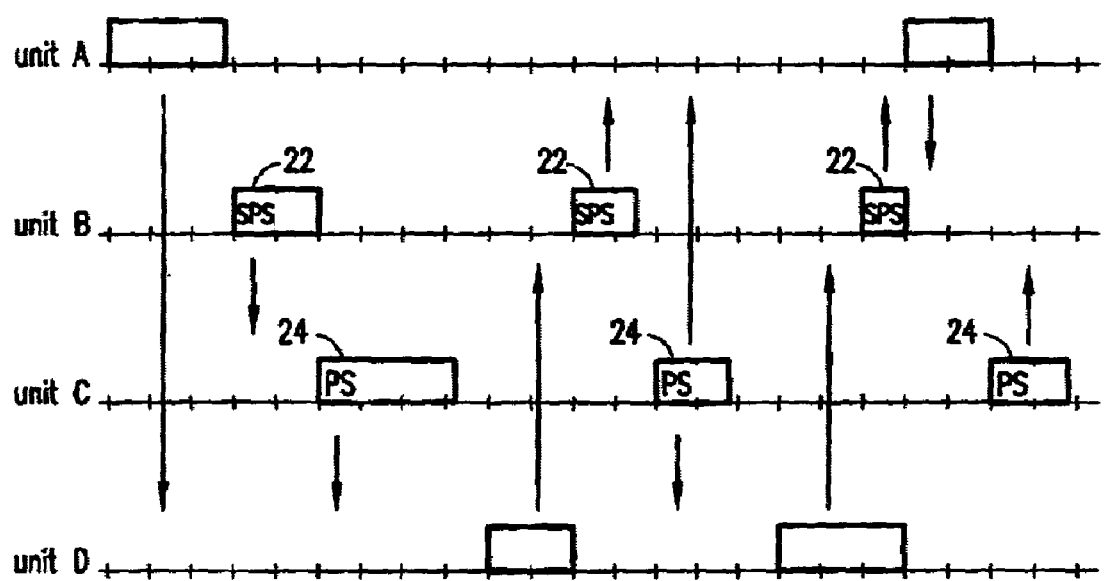
FIG. 4 shows transmissions of respective units of FIG. 3 in accordance with an embodiment of the invention, over a succession of time slots.

Referring to FIG. 4, there is shown unit B defined to be the supervisory unit. There is further shown unit B provided with supervisory priority slots 22, at fixed eight slot intervals. Supervisory priority slots 22 are offset from priority slots 24 assigned to unit C, which also occur at eight slot intervals. The spacing of the supervisory priority slots 22 is usefully set according to the clock drift of the nodes or units present in the network. FIG. 4 further shows unit A initiating transmission, with the token passing to unit D. However, the token is preempted by unit B on the basis of the first supervisory priority slot 22, when the unit A transmission ends. After the B unit transmission the token is preempted by the C unit, at the first supervisory priority slot 24. The C unit transmits to the D unit, and the D unit then transmits to the B unit. Thereafter, transmission continues in accordance with the principles described in connection with FIGS. 1 and 2, as modified in accordance with embodiments of the invention.

An essential rule associated with the supervisory priority slots 22, in accordance with the invention, is that all non-supervisory units, that is, units A, C and D in network 10, must monitor or listen to supervisory unit B during each of the supervisory priority slots. A further essential rule is that any instruction to reconfigure the network, that is, to change priority which a particular unit or node has to particular time slots, can be broadcast or transmitted only from the supervisory unit, and only during one of the supervisory priority slots 22.

Defining one of the nodes as a supervisor, together with establishing the above rules in regard to the supervisory priority slots, provides several important benefits. Ambiguity problems are significantly reduced thereby, since only the supervisory unit can broadcast or "announce" changes to the network configuration. Also, since changes in network configuration can only be transmitted during supervisory priority slots, and since all units must listen to transmissions during these slots, all units can remain updated with respect to network configuration changes, just by tracking the supervisory priority slots. Accordingly, all units remain aware of the priority slots of the other units, and they can transmit arbitrarily without violating priority agreements among particular units.

The inventive concept described above is also beneficial in situations where all units of the network are unable to receive transmissions from all other units. The probability that all units will be able to monitor one particular node or unit (i.e., the supervisory unit) is higher than the probability that all units will be able to monitor every other unit in a radio environment.

As a further benefit, disadvantages inherent in providing a centralized network control of the prior art, as described above, are alleviated by not providing the supervisory unit with control of the network for real-time operations. That is, it is not necessary to route all network traffic through the supervisory unit, as is done with the master-slave based MAC previously referred to.

Using the Ping-Pong protocol of the prior art, synchronization is maintained by tracking the headers of successive transmissions. If a unit can successfully read a header, it can determine when the corresponding transmission will end, and also whether it is the intended recipient of the transmitted packet. If the unit is not the intended recipient, it can suspend reception and thereby save power. In the prior art arrangement, however, the unit must "wake up" to monitor the very next transmission, in order to find out whether the next transmission is destined for it or not. In contrast to such arrangements, by providing the supervisory priority slots 22 of the invention, respective non-supervisory units in the network are only required to wake up during these slots.

Thus, embodiments of the invention can achieve significant reductions in power consumption over the prior art. Such embodiments may also increase efficiency by reducing wasted bandwidth.

By distributing all information pertaining to network configuration to all nodes or units, as described above, any unit can assume the supervisory function. Thus, in embodiments of the invention the function of the supervisory unit is limited to announcing network changes, and does not include making decisions for other units of the network. Also, when the supervisory unit drifts out of range or otherwise becomes unavailable to non-supervisory units, traffic in the network simply continues. The only limitation is that changes may not be made to the existing network, since they cannot be announced or broadcast. However, a new unit may assume the role of supervisor, whereupon configuration changes can again be made.

Embodiments of the invention provide further benefits and advantages in that respective units of the network only need to track transmissions during the supervisory priority slots to remain synchronized. These priority slots can also be used to distribute the token to units in order to obtain fairness, which is not necessarily guaranteed in protocols of the prior art. The interval between consecutive supervisory priority slots is bounded by constraints in the device implementations and traffic and control requirements. An upper limit is set by the clock drift in the radio devices. The priority interval should be sufficiently small to prevent a radio device coming out of sync. The required interval is inversely proportional to the mutual drift between the device and the supervisor. If several devices are served by the same supervisor, the device with the largest drift will determine the interval. The interval is also determined by the traffic and control requirements. Depending on the latency requirements in the broadcast function and the token distribution function, the supervisory priority interval can be increased or decreased. The supervisory priority slots, like any other priority slots, interrupt the distributed MAC control among the devices.

Figure 5:
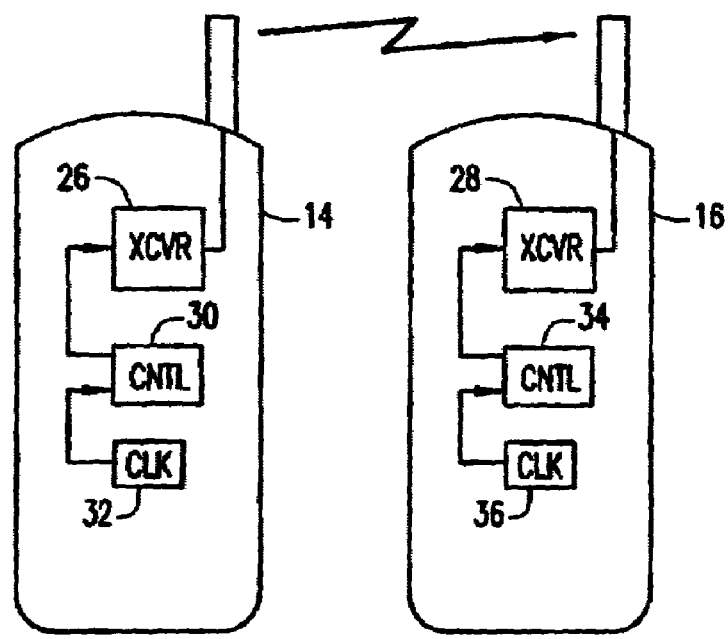
FIG. 5 is a simplified schematic diagram depicting a supervisory unit and a non-supervisory unit for the network of FIG. 3.

Referring to FIG. 5, there is shown a supervisory unit 14 for network 10, such as unit B, and a non-supervisory unit 16 such as unit C. Units 14 and 16 are provided with transceivers 26 and 28, respectively, for enabling the units to selectively transmit and receive radio signals in the channel established amongst the units of network 10 as described above. Supervisory unit 10 is further provided with a control 30 for operating unit 14 to carry out its supervisory functions, as previously described. Thus, control 30, provided with a clock 32, designates certain time slots as special priority slots 22, and operates transceiver 26 to transmit network configuration instructions during some of the special priority slots. FIG. 5 further shows unit 16 provided with a control 34 having a clock 36 for operating transceiver 28 to listen to transmissions from unit 14 during each supervisory priority slot and to keep track of network configurations and reconfigurations.

Many other modifications and variations of the present invention are possible in light of the above teachings. It is therefore to be understood that within the scope of the disclosed concept, the invention may be practiced otherwise than as had been specifically described.

What is claimed is:

1. In a communication network comprising a plurality of units and having a distributed Multiple Access Control (MAC) protocol, wherein data is exchanged between units during at least some of the time slots in a succession of time slots, a method for establishing a particular network configuration comprising the steps of:
  designating at least one of said units as a supervisory unit and at least one of the remaining units as non-supervisory units;
  selecting certain of said time slots as supervisory priority slots;
  requiring all of said non-supervisory units to monitor transmissions from said supervisory unit during each of said supervisory priority slots;
  operating said supervisory unit to transmit a network configuration instruction to establish said particular network configuration only during one of said supervisory priority slots;
  wherein said supervisory unit is not responsible for controlling network traffic in real-time; and
  wherein said network traffic is not routed through the supervisory unit.

2. The method of claim 1 further comprising the step of:
designating, via said network configuration instruction, a specified time slot as being a priority time slot to a specified one of said units.

3. The method of claim 1 further comprising the step of:
designating, via said network configuration instruction a specified address representing a physical device or an end point of a logical link, selectively.

4. The method of claim 1 further comprising the step of:
setting the spacing of said supervisory priority slots in said succession according to the clock drift of respective units in said network.

5. The method of claim 1 wherein:
changes in network configuration may not occur without participation of said supervisory unit.

6. In a communication network comprising a plurality of units and having a distributed Multiple Access Control (MAC) protocol, wherein data is exchanged between units during at least some of the time slots in a succession of time slots, a method for establishing a particular network configuration comprising the steps of:
  designating at least one of said units as a supervisory unit and at least one of the remaining units as non-supervisory units;
  selecting certain of said time slots as supervisory priority slots;
  requiring all of said non-supervisory units to monitor transmissions from said supervisory unit during each of said supervisory priority slots;
  operating said supervisory unit to transmit an instruction to establish said particular network configuration only during one of said supervisory priority slots;
  wherein said supervisory unit is not responsible for controlling network traffic in real-time;
  wherein said network traffic is not routed through the supervisory unit; and
  recognizing if said supervisory unit has become unavailable to said network, and, in such event, thereafter designating one of said non-supervisory units as a new supervisory unit.

7. The method of claim 1 further comprising the steps of:
transmitting, by a first unit of said network a first packet including a first length indicator to a second unit and;
receiving, by said second unit said first packet and in response thereto to transmitting a second packet including a second length indicator toward any other selected unit of said network including said first unit.

8. The method of claim 1 further comprising the step of:
employing a Ping-Pong protocol to control traffic in said network.

9. The method of claim 7 further comprising the step of:
employing, by said network a configuration of priority slots and a token concept to control traffic in said network.

10. The method of claim 1 further comprising the step of:
using a mobile phone for at least one of said units for wireless data communication.

11. The method of claim 1 further comprising the step of:
using a Bluetooth network as said network.

12. In a communication network comprising a plurality of units and having a distributed Multiple Access Control (MAC) protocol, wherein data is exchanged between units during at least some of the time slots in a succession of time slots, an apparatus for establishing a particular network configuration comprising:
  a transmitter component in one of said units designated as a supervisory unit;
  a first control mechanism in said supervisory unit for operating said transmitter component to transmit a specified instruction only during a selected time slot comprising a supervisory priority slot, said instruction disposed to establish said particular network configuration;
  a receiver component in each of the remaining non-supervisory units;
  a second control mechanism in each of said non-supervisory units for operating the respective receiver components therein to monitor transmissions from said supervisory unit transmitter during each of said supervisory priority slots;
  wherein said supervisory unit is not responsible for controlling network traffic in real-time; and
  wherein said network traffic is not routed through the supervisory unit.

13. The apparatus of claim 12 wherein:
said network configuration instruction designates a specified time slot as being a priority time slot to a specified one of said units.

14. The apparatus of claim 12 wherein:
the spacing of said supervisory priority slots in said succession is set according to the clock drift of respective units in said network.

15. The apparatus of claim 12 wherein:
changes in network configuration may not occur without participation of said supervisory unit.

16. The apparatus of claim 12 wherein:
a Ping-Pong protocol is employed to control traffic in said network.

17. The apparatus of claim 12 wherein:
said network further employs a configuration of priority slots and a token concept to control traffic in said network.

18. The apparatus of claim 12 wherein:
at least one of said units comprises a mobile phone for wireless data communication.

19. The apparatus of claim 12 wherein:
said network comprises a Bluetooth network.

20. In a communication network comprising a plurality of units and having a distributed Multiple Access Control (MAC) protocol, wherein data is exchanged between units during at least some of the time slots in a succession of time slots, an apparatus for establishing a particular network configuration comprising:

a transmitter component in one of said units designated as a supervisory unit;

a first control mechanism in said supervisory unit for operating said transmitter component to transmit a specified instruction only during a selected time slot comprising a supervisory priority slot, said instruction disposed to establish said particular network configuration;

a receiver component in each of the remaining non-supervisory units;

a second control mechanism in each of said non-supervisory units for operating the respective receiver components therein to monitor transmissions from said supervisory unit transmitter during each of said supervisory priority slots;

wherein said supervisory unit is not responsible for controlling network traffic in real-time;

wherein said network traffic is not routed through the supervisory unit; and means for recognizing if said supervisory unit has become unavailable to said network, and, in such event, thereafter designating one of said non-supervisory units as a new supervisory unit.

* * * * *